US011033792B1

(12) United States Patent
Jain

(10) Patent No.: US 11,033,792 B1
(45) Date of Patent: Jun. 15, 2021

(54) GOLF SWING TRAINING DEVICE

(71) Applicant: Tarun Jain, Gurgaon (IN)

(72) Inventor: Tarun Jain, Gurgaon (IN)

( * ) Notice: Subject to any disclaimer, the term of this patent is extended or adjusted under 35 U.S.C. 154(b) by 0 days.

(21) Appl. No.: 15/916,162

(22) Filed: Mar. 8, 2018

(51) Int. Cl.
*A63B 69/36* (2006.01)
*G09B 19/00* (2006.01)

(52) U.S. Cl.
CPC .......... *A63B 69/36* (2013.01); *G09B 19/0038* (2013.01)

(58) Field of Classification Search
CPC ............ A63B 69/3632; A63B 69/3608; A63B 71/0622; A63B 15/005
USPC .......................................................... 473/267
See application file for complete search history.

(56) References Cited

U.S. PATENT DOCUMENTS 1,963,057 A * 6/1934 Wilcox .................. B21D 15/02 138/173
5,152,731 A * 10/1992 Troutman .......... A63B 21/0724 482/106
9,237,785 B2 * 1/2016 Ma .......................... A45B 17/00
2005/0126465 A1 * 6/2005 Wilcox .................. A01K 91/08 114/255

* cited by examiner

*Primary Examiner* — Raeann Gorden
(74) *Attorney, Agent, or Firm* — Michael D. Eisenberg

(57) ABSTRACT

A golf swing training device, comprising a cylindrical rod and a cylindrical sleeve configured to receive the rod. The rod has a first groove located on the rod and a second groove spaced a distance apart from the first groove on the rod. A diameter of the sleeve is larger than a diameter of the rod. The sleeve is configured to rotate around the rod but confined to the distance between the first and second grooves.

3 Claims, 8 Drawing Sheets

GOLF SWING TRAINING DEVICE

FIELD OF THE INVENTION

The present invention relates to the field of golf swing training aids.

BACKGROUND OF THE INVENTION

Many concepts have been developed to assist with training the golf swing, including the natural golf, Jim Mclean 8th step, perfect swing, rotary swing and similar variants. They are generally strategies focused on the positioning of specific body parts and initial setup procedures. These concepts have tried to assess the golf swing using their respective strategies and then correct the swing based on the deficiency in relation to the concept. Others have worked on fixing the specific body part error on the basis of either the swing plane concept or on the basis of generally accepted facts about the faulty movement of the body parts and the swing.

Golf literature, books, manuals, and golf instructions are based on fixing the swing problems which are visible to the naked eye or to a camera. It involves correction by doing the opposite of the observed problem, which in turn leads to the initiation of a different issue. This happens because none of these concepts target the cause of the problem. At impact, the club has to be square to deliver a linear acceleration to the golf ball. The greater the square impact of the club face on the ball, the less spin on the ball, which leads to better distance and direction.

The present invention includes a “cam” mechanism to solve the foregoing issues. A cam is a rotating or sliding piece in a mechanical linkage used in transforming rotary motion into linear motion. The cam mechanism moves the body in rotary movement and is converted into linear movement at impact, which generates distance and imparts direction to the fall.

BRIEF SUMMARY OF THE EMBODIMENTS OF THE INVENTION

In a variant, a golf swing training device, comprising a cylindrical rod and a cylindrical sleeve configured to receive the rod. The rod has a first groove located on the rod and a second groove spaced a distance apart from the first groove on the rod. A diameter of the sleeve is larger than a diameter of the rod. The sleeve is configured to rotate around the rod but confined to the distance between the first and second grooves.

In another variant, the sleeve is configured to slide along the rod.

In a further variant, the sleeve has a knob configured to be received into the first groove of the rod and a sloped projection configured to be received into the second groove of the rod.

In yet another variant, the rod is configured to rotate within the sleeve clockwise and counterclockwise between 0 to at least 22.5 degrees.

In another variant, the sleeve is configured to rotate counterclockwise between 0 to at least 45 degrees.

In a further variant, the sleeve is configured to lock in place relative to the rod after rotating at least 45 degrees clockwise.

In yet another variant, the sleeve is configured to lock in place relative to the rod after rotating at least 45 degrees counterclockwise.

In another variant, the rod comprises a raised surface configured to receive the sleeve.

DETAILED DESCRIPTION OF THE EMBODIMENTS OF THE INVENTION

The following reference numbers are used throughout the description to refer to components on the drawings:

10 Rod
15 Sleeve
20 First groove
25 Second groove
30 Knob
35 Sloped projection In a variant, referring generally to FIGS. 1-8, a golf swing training device comprises a rod 10 and a sleeve 15 that is configured to slide over the rod 10. Both the rod 10 and the sleeve 15 are cylindrical in shape, with the sleeve 15 having a slightly wider diameter than the rod 10. The rod 10 is a solid piece of material with a length of 36 inches and diameter of 19 mm. The sleeve 15 is 9 inches long and has a hollow body. The sleeve 15 has a diameter of 22 mm.

Figure 1:
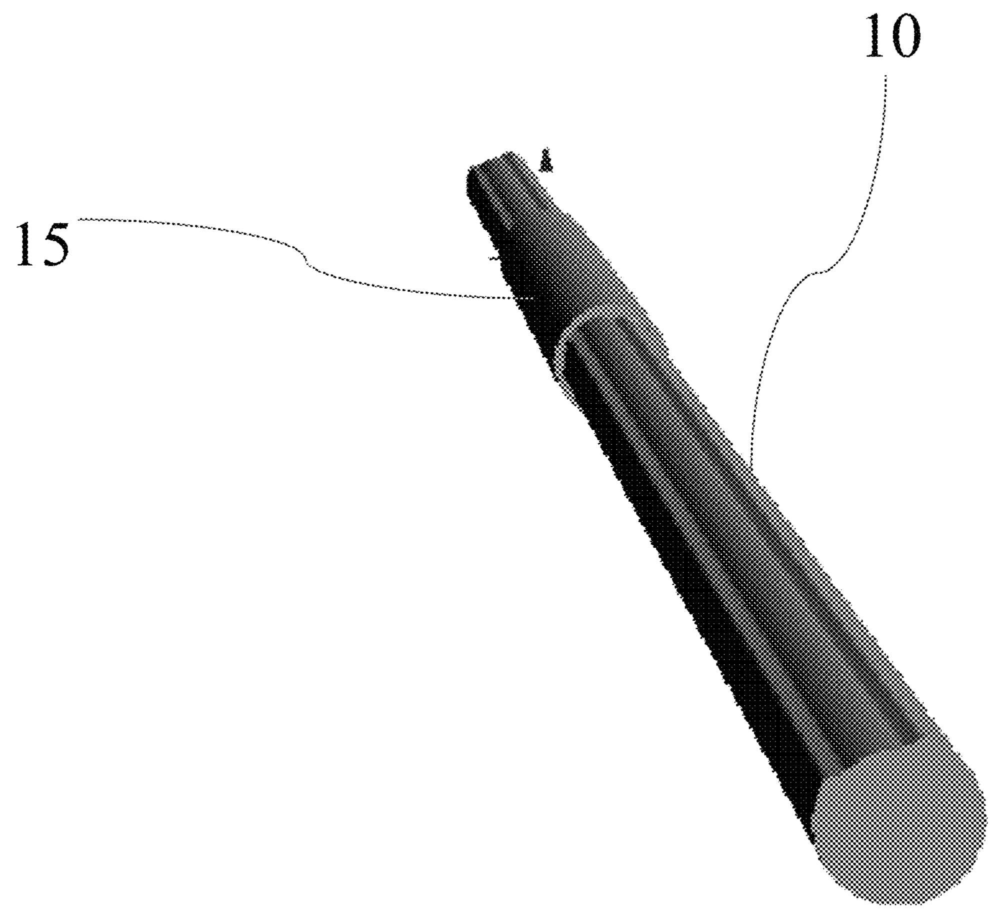
FIG. 1 illustrates an angled, top view of the sleeve on the rod.
Figure 2:
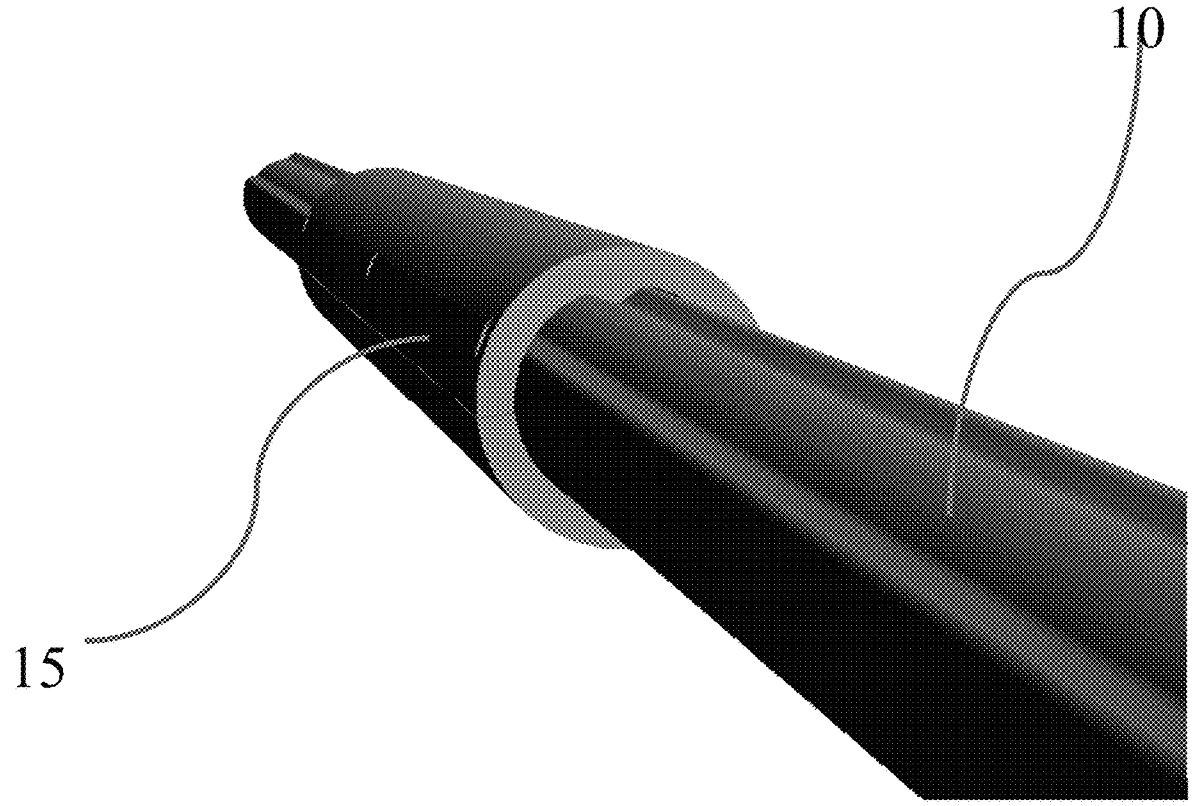
FIG. 2 illustrates a magnified, angled view of the sleeve on the rod.
Figure 3:
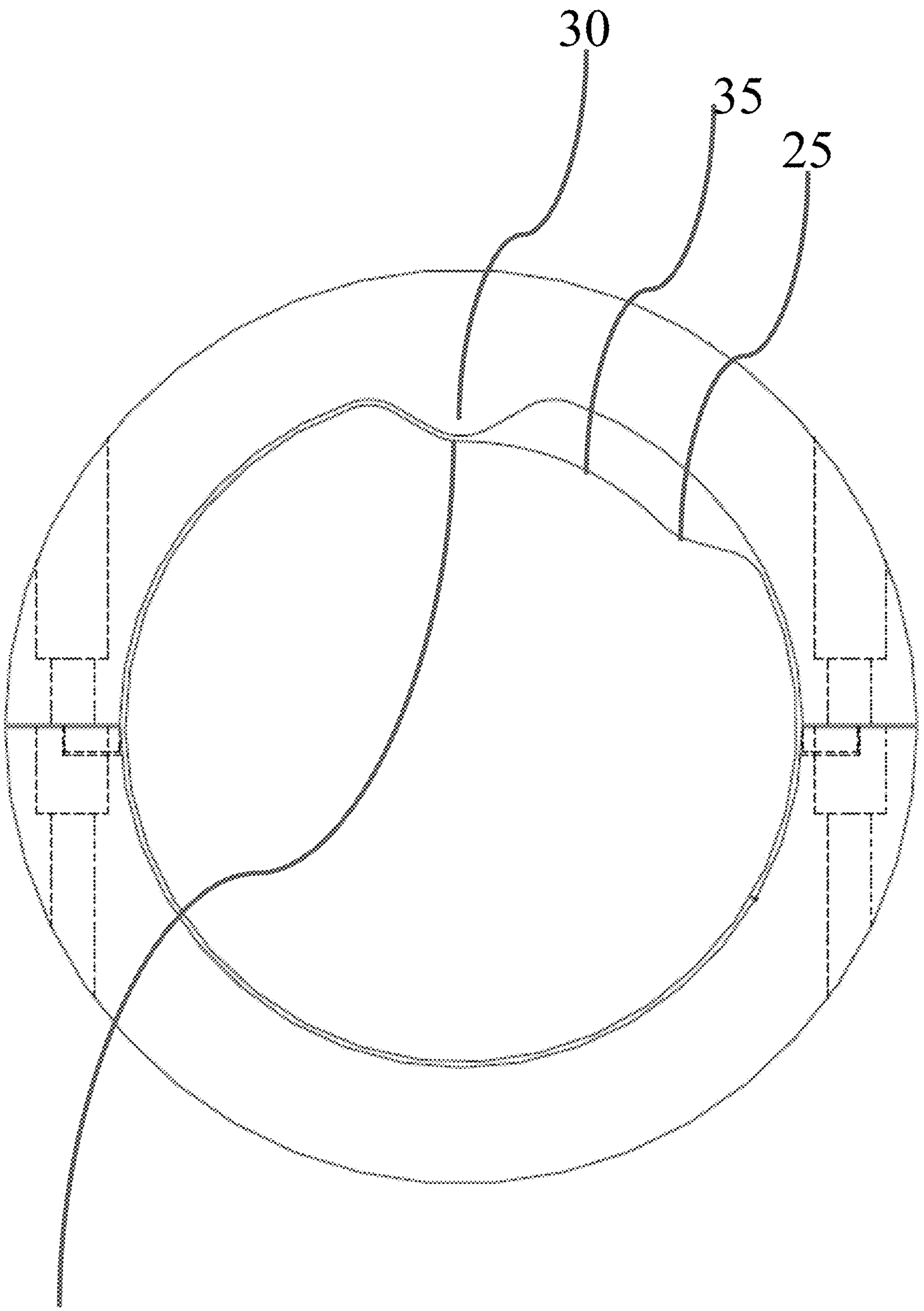
FIG. 3 illustrates a perspective view of the knobs on the sleeve secured into the grooves on the rod.
Figure 4:
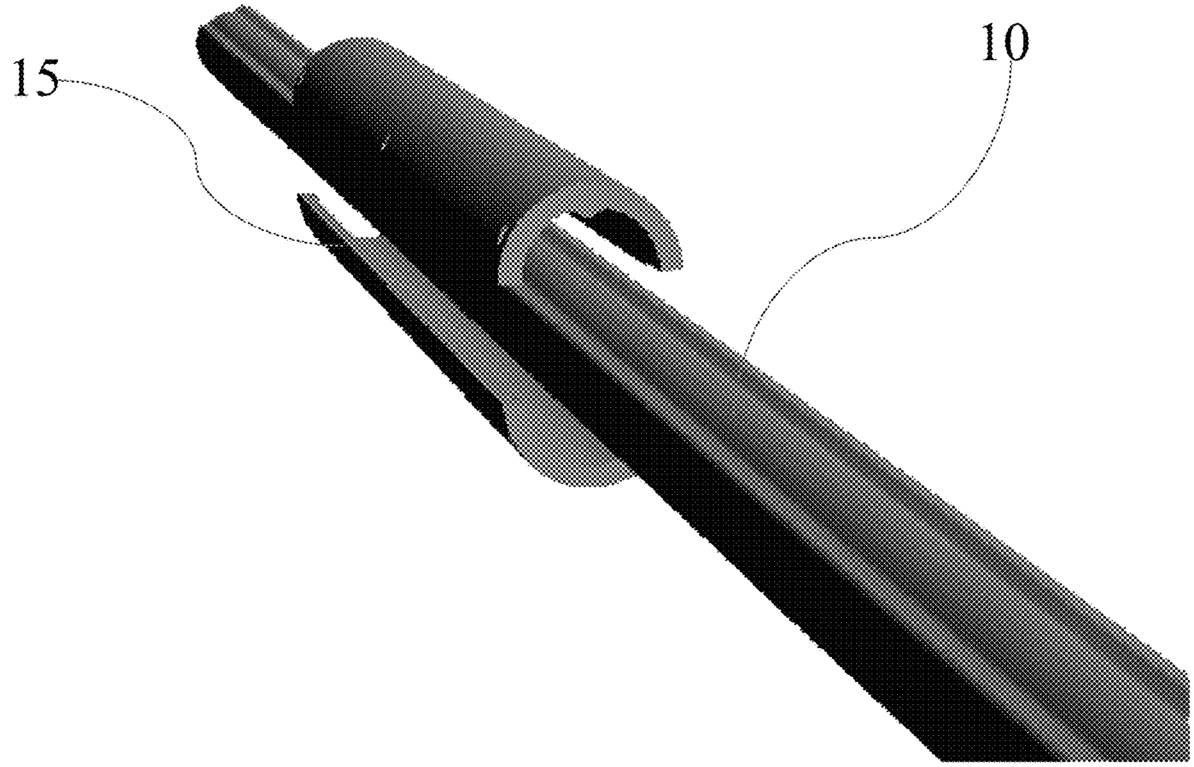
FIG. 4 illustrates a magnified, angled view of the sleeve rotated around the rod.
Figure 5:
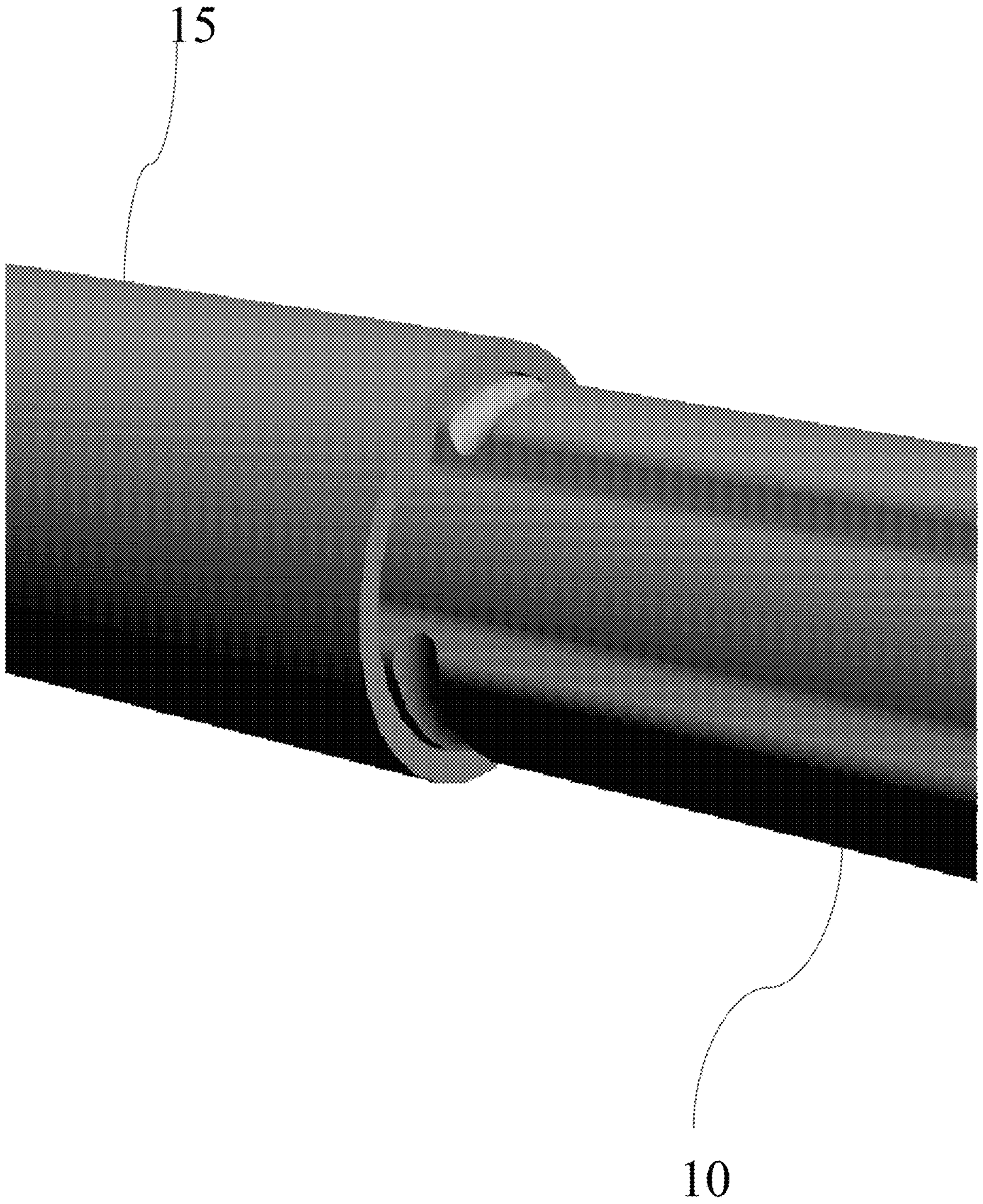
FIG. 5 illustrates a magnified, angled side view of the rod fitted into the sleeve.
Figure 6:
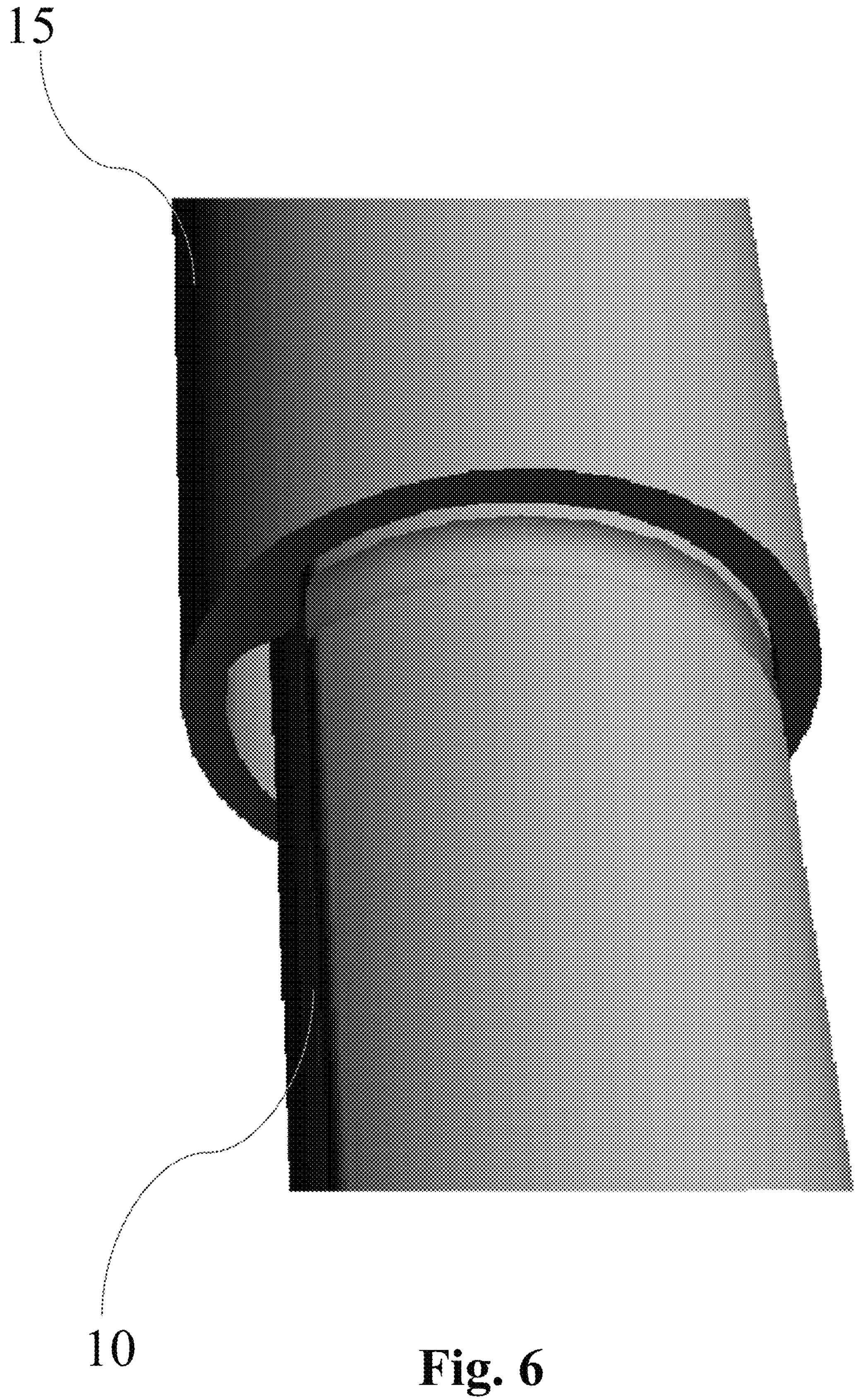
FIG. 6 illustrates a magnified, top view of the rod fitted into the sleeve.
Figure 7:
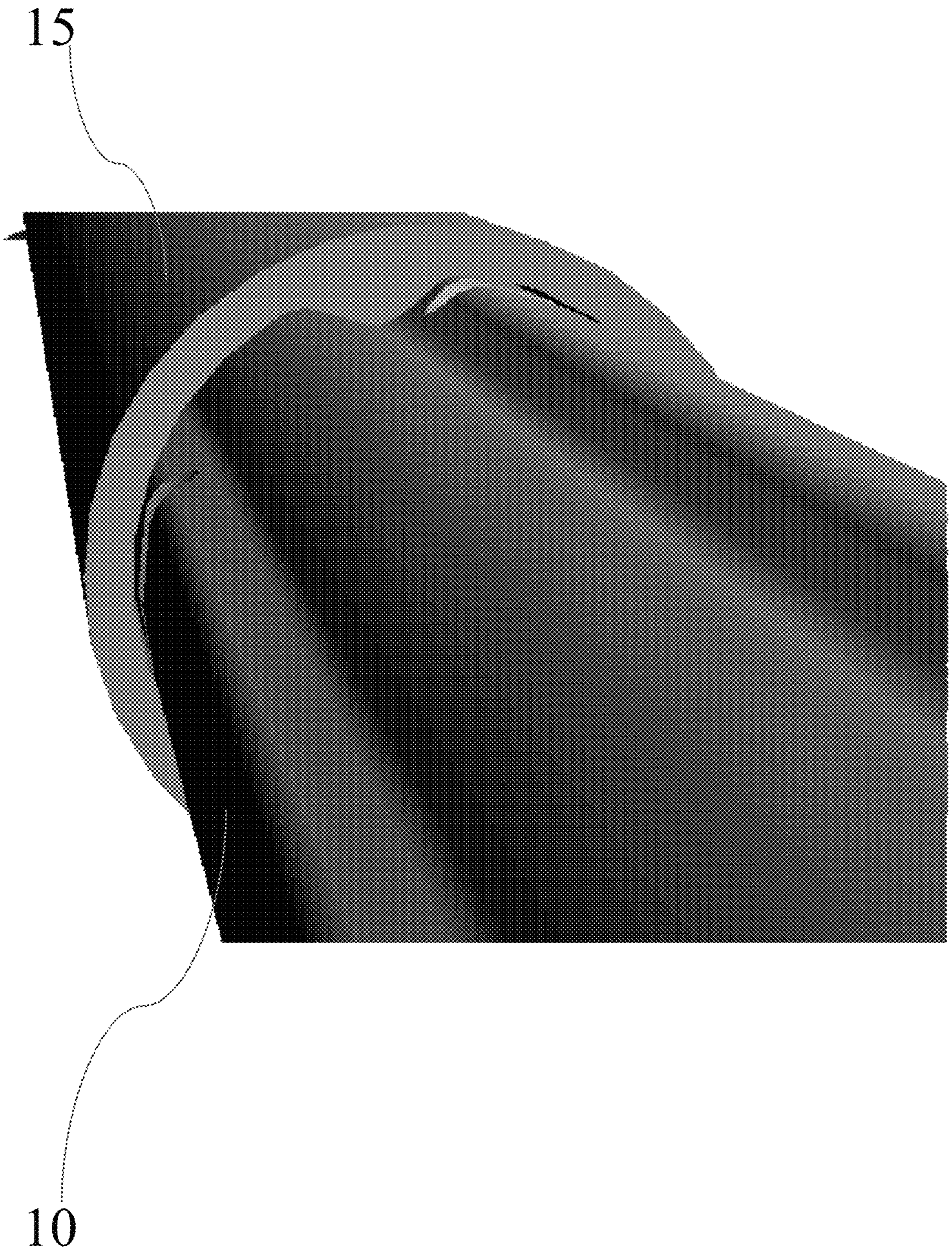
FIG. 7 illustrates a magnified, angled view of the rod fitted into the sleeve.
Figure 8:
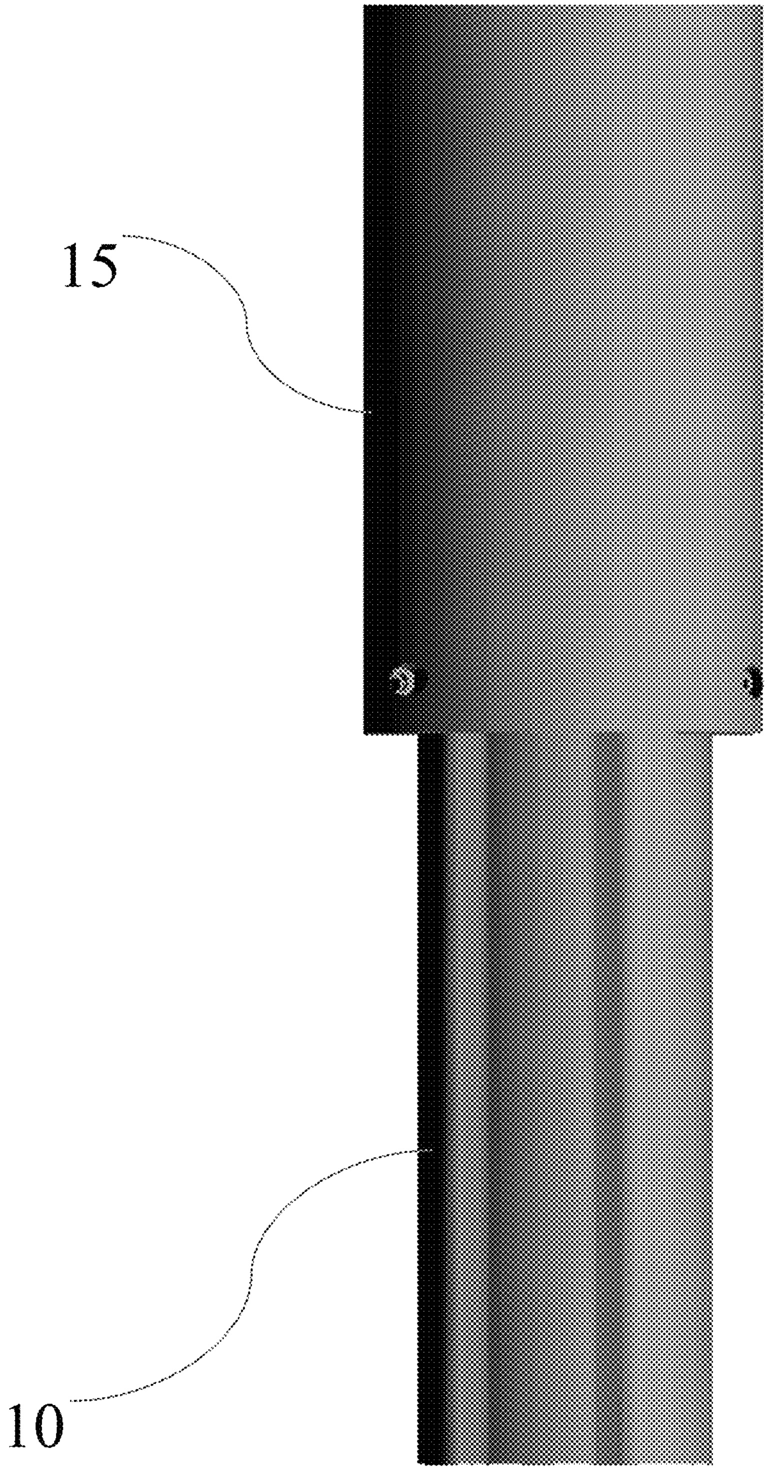
FIG. 8 illustrates a magnified, bottom view of the rod fitted into the sleeve.

In a further variant, referring to FIG. 3, the rod 10 comprises a “cam” mechanism and the sleeve 15 comprises a “cam” mechanism. The mechanism makes the sleeve 15 rotate 45 degrees in total (22.5 degrees on each side). A cam is a rotating or sliding piece in a mechanical linkage used especially in transforming rotary motion into linear motion. Mechanical engineering concepts use a “cam” mechanism. This helps in converting a rotatory movement into a linear movement. The cam mechanism moves the body in rotary movement and is converted into a linear movement. There are two grooves 20, 25 on the rod 10 and a knob 10 on the sleeve 15. The knob 30 fits into the first groove 20 and the sloped projection 35 fits into the second groove 25 when the sleeve 15 rotates 45 degrees clockwise and 45 degrees counterclockwise. The sloped projections 15 prevents the sleeve 15 from sliding further down the rod 10.

In yet another variant, a right-handed golfer who swings the golf club in a traditional, right-handed manner, begins the back swing when he grips the rod 10 above the sleeve 15 with his left hand and grips the sleeve 15 with his right hand. The starting position of the sleeve 15 and rod 10 is such that rod 10 can’t rotate to the right (clockwise) but it can rotate to the left side of the body (counterclockwise). The golfer then moves his shoulder with the trunk for the first 10-15 minutes with no movement of the device. The golfer rotates the sleeve 15 counterclockwise to the left side until it locks to its maximum possible rotation (45 degrees). The shoulder rotation continues as far as the golfer's body permits. At this point, the legs, trunk, arm parts, club placement, shaft, and club face will all be in place as necessitated by golfing fundamentals.

In another variant, the golfer begins the downward swing when he rotates the sleeve 15 in the clockwise direction to the right side and continues doing that until the golfer strokes the ball. After stroking the ball, all of the body parts, pivot, club shaft, face, and plane will automatically be in a finished position.

What is claimed is:

1. A golf swing training device, comprising:

a cylindrical rod;

a cylindrical sleeve configured to receive the rod, wherein the sleeve is configured to rotate 45 degrees in a clockwise direction or a counterclockwise direction;

a knob disposed on the sleeve such that the knob resides along a common surface of the sleeve, thereby the common surface of the sleeve adopts a first arrangement;

a first groove disposed on the rod, a sloped projection disposed on the rod, and a second groove disposed on the rod such that the sloped projection, the first groove, the second groove reside along a common surface of the rod, thereby the common surface of the rod adopts a second arrangement;

wherein the second groove is spaced a distance apart from the first groove on the rod;

wherein a diameter of the sleeve is larger than a diameter of the rod;

wherein the sleeve is configured to: rotate around the rod, convert rotary movement to linear movement, and be confined to the distance between the first and second grooves; and wherein the first arrangement differs from the second arrangement, such that the common surface of the sleeve is configured for receiving the common surface of the rod.

2. The device of claim 1, wherein the sloped projection is configured to prevent the sleeve from sliding down the rod.

3. The device of claim 1, wherein the knob is configured to be received into the first groove of the rod.

* * * * *